(12) United States Patent
Lundblad

(10) Patent No.: US 8,032,459 B2
(45) Date of Patent: Oct. 4, 2011

(54) BANKNOTE-HANDLING SYSTEM

(75) Inventor: Leif Lundblad, Stockholm (SE)

(73) Assignee: Nybohov Development AB, Stockholm (SE)

( * ) Notice: Subject to any disclaimer, the term of this patent is extended or adjusted under 35 U.S.C. 154(b) by 1267 days.

(21) Appl. No.: 10/275,977

(22) PCT Filed: Jun. 14, 2001

(86) PCT No.: PCT/SE01/01349
§ 371 (c)(1), (2), (4) Date: Nov. 19, 2002

(87) PCT Pub. No.: WO01/97129
PCT Pub. Date: Dec. 20, 2001

(65) Prior Publication Data
US 2003/0120569 A1 Jun. 26, 2003

(51) Int. Cl.
*G06Q 40/00* (2006.01)
(52) U.S. Cl. .......................... 705/43; 705/42
(58) Field of Classification Search ............... 705/35, 705/37, 43; 235/379, 380, 381, 382, 462
See application file for complete search history.

(56) References Cited

U.S. PATENT DOCUMENTS 5,983,197 A * 11/1999 Enta ........................... 705/16
6,308,887 B1 * 10/2001 Korman et al. ............ 235/379
6,311,165 B1 * 10/2001 Coutts et al. ................ 705/21
7,219,083 B2 * 5/2007 Bellucci et al. ............. 705/43
7,636,438 B1 * 12/2009 Lamla et al. ................ 380/33

FOREIGN PATENT DOCUMENTS

| JP | 3-225555 | 10/1991 |
| WO | 99/28847 | 6/1999 |
| WO | PCT/SE99/01187 | * 5/2000 |

* cited by examiner

*Primary Examiner* — Hani M Kazimi
*Assistant Examiner* — Hatem Alii
(74) *Attorney, Agent, or Firm* — Jacobson Holman PLLC

(57) ABSTRACT

A banknote-handling system includes a plurality of banknote-handling machines (11, 12, . . . ); a plurality of banks (16, 17) for accounting purposes, etc; a co-ordinating central unit (10); a transport system (18, 19 . . . ) for transporting banknotes between the machines and the banks; a central bank (15) for monitoring the activity and banknote-handling of respective banks; and an electronic information and signal transmission system (1-2) for enabling individual and co-operative activities of the units to be achieved. The information and signal transmission system (1-2) is divided into two subsystems. One subsystem (1) includes the transmission of information and signals that relate to and have their basis in transactions between the banks (16, 17) and the general public/businesses relating to their activities in respect of banknote-handling. The other subsystem (2) includes the purely administrative and technical signal transmission required for the requisite co-operation between the various units included in the system, for instance co-ordinating central unit-vehicles, banknote-handling machines-banks, within the banknote-handling system.

17 Claims, 2 Drawing Sheets

BANKNOTE-HANDLING SYSTEM

FIELD OF INVENTION

The present invention relates to a banknote-handling system including a number of bank note-handling machines, a number of banks, a co-ordination centre, a transport system, a central bank, and an electronic information and signal transfer system.

SUMMARY OF THE INVENTION

According to the invention, the system is designed to divide the electronic information and signal system into two mutually separate subsystems. One subsystem includes information and signal transfer that relates to and has its basis in transactions, i.e., transaction handling components. The transaction handling components can include, for instance banknote-handling between the banks on the one hand and the general public and businessmen on the other hand, with respect to their activities in the banknote-handling system. The second subsystem includes purely administrative and technical signal transfer necessary for the requisite co-operation between the various units, i.e., administrative handling components. The administrative handling components handle, for instance, cooperation between the coordination centre and vehicles, and cooperation between the banknote-handling machines and the banks, within the banknote-handling system.

Other characteristic features of an inventive banknote-handling system will be apparent as set forth herein.

DESCRIPTION OF PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
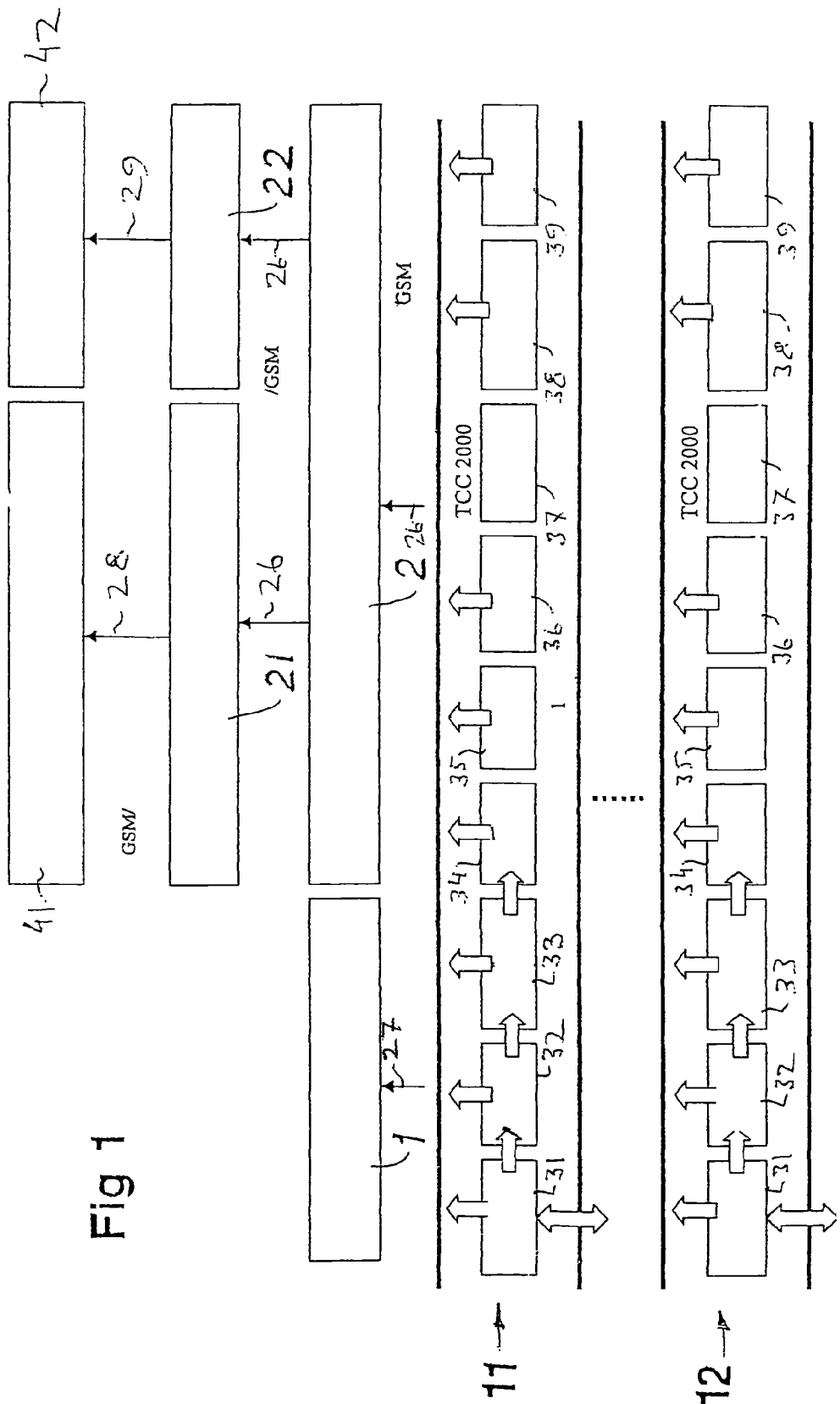
FIG. 1 is a schematic illustration of the electronic information and signal transmission system according to the present invention.

Shown in FIG. 1 are two (11 and 12) of a plurality (n in number) of TCC 2000-type banknote-handling machines. Each machine has the respective notations: Deposit/Withdrawal 31; Quality Sorting 32, One-time Cassette 33, Safety Box 34, Machine Statistics 35, Error Reports 36, Erroneous Handling 37, Suspected Forgeries 38, Banknote Storage Info 39. These notations are sufficiently self-explanatory to enable the invention to be fully understood with respect to principle, without requiring further explanation.

Referring to FIG. 1, requisite information and signal transmission from components of the banknote-handling machine including deposit/withdrawal 31, quality sorting 32, and one-time cassette 33 relate to, and have their basis in, transactions, for example banknote-handling between the banks on the one hand and the general public and businesses on the other hand, with respect to their activities in the banknote-handling system.

The purely administrative and technical signal transmission required from the remaining six parts 34, 35, 36, 37, 38, 39 of FIG. 1 relates to the co-operation between the various units, for instance, cooperation between the coordination centre and cars, and cooperation between the banknote-handling machines and the banks and between the central bank and banks within the banknote-handling system.

Purely transaction data generally requires fast connections. For instance, when a person identifies himself/herself with his/her cash card, credit card or the like, it is necessary for the bank concerned to quickly validate the identity of said person, which requires a fast or high speed data connection. This information flow subsystem 1 is designated "transaction data" in FIG. 1.

Purely administrative and technical signal transmission, such as machine statistics and error reports, for instance, does not, of course, require the same speed and can therefore be effected by slower transmissions, e.g. call connections/GSM. This information flow subsystem 2 (the second subsystem) is designated "logistic and technical data" in FIG. 1.

In practice, it has been found appropriate to divide the second subsystem, in turn, into two separate subsystems, of which a technical third subsystem 21 includes technical signal transmission for necessary technical service to units included in the bank handling system, e.g. service vehicles, and an administrative fourth subsystem 22 that includes administrative signal transmission for necessary/desirable information concerning the current flow of banknotes in the banknote-handling system, e.g. optimisation of the banknote flows, control of banknote qualities, and so on, on behalf of the central bank, e.g. Bank of Sweden and the police authorities. As discussed further hereinafter, each of these subsystems have separate communications connections.

The units which may be included in the inventive system will now be described briefly with reference to FIG. 2.

A number of bank handling machines or telling machines 11, 12, 13, 14, . . . 1n are disposed over a limited geographical area, for depositing and dispensing banknotes. The machines are designed for bundling and packaging in cassettes surplus banknotes of accepted quality on the one hand, banknotes of unacceptable quality on the other hand, and possible forged banknotes on the third hand.

The machines communicate with a common information centre 10 which receives infor-mation from and sends information and control signals to said machines, this information including factual information concerning the existence of stored banknotes and cassette-packaged banknotes, and also relating to detected banknotes of unacceptable quality and also banknotes that are suspected of being fraudulent.

The system also includes a plurality of transporters 18, 19, 20 for transporting cassette-packaged banknotes to and from the machines 11 . . . 1n in response to an order from the information centre 10, depending on the information fed to the machines from the centre.

Indicated in the figure are two banks 16, 17 which may be the owners of machines and have responsibility for said machines in each respective region of the geographically limited area. The main responsibility in the community for banknote-handling lies with the central bank 15 (Bank of Sweden). The broken lines indicate communications connections between the various units (the banknote-handling machines/the central unit, the trans-porters/the central unit, the banks/the central unit, the banks/the central bank).

Because each machine, each transporter, each security bank used in conjunction with transporters for the transportation of cassettes/banknotes between the various units, and each person active within the system, can be given an individual identity (code), the central unit has control/knowledge of where banknotes/cassettes are located and their destination at each moment in time. This provides a very high degree of security to the novel, simpli-fied and cost-reducing modern banknote-handling system.

Figure 2:
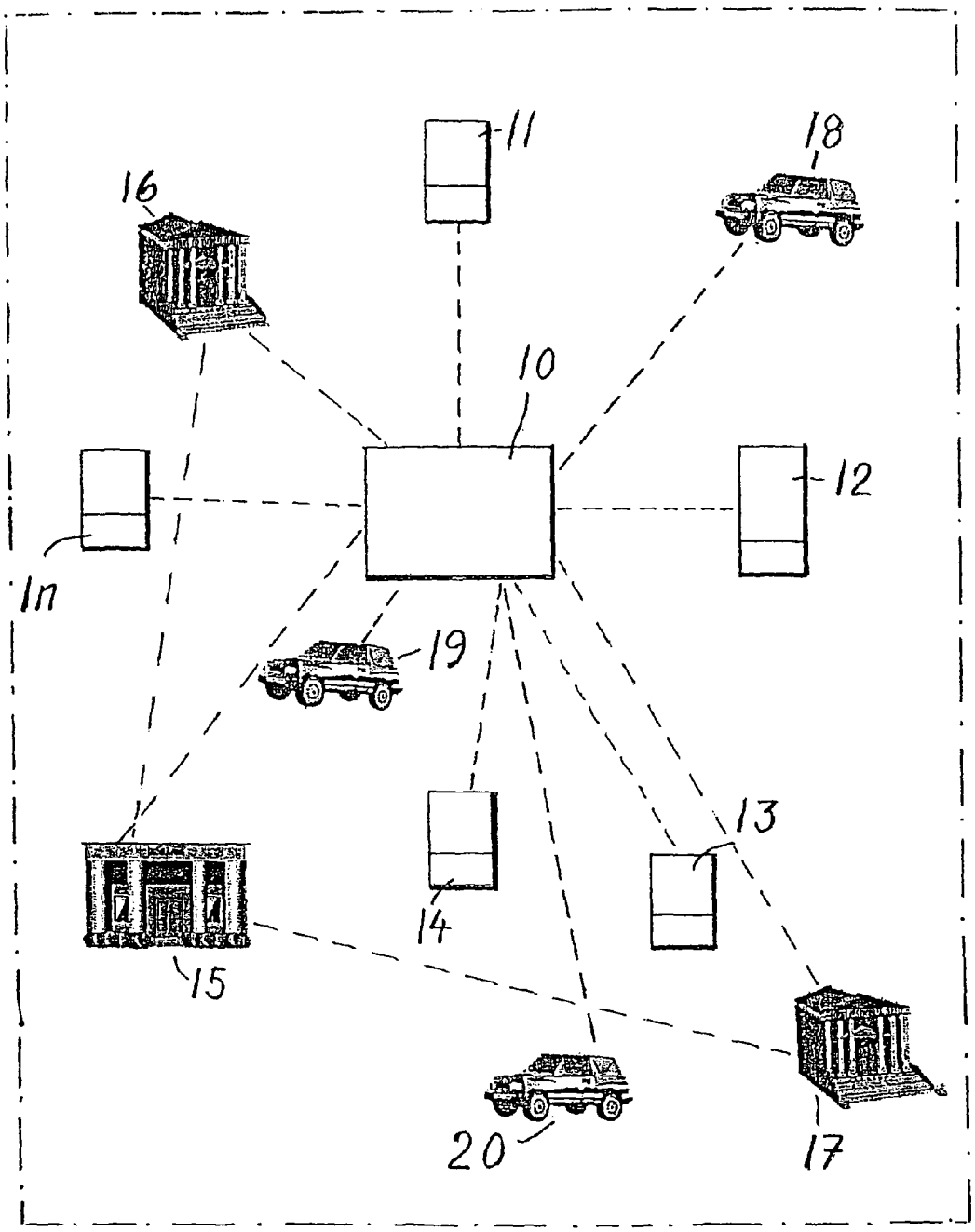
FIG. 2 is an overview of the units included in the system of FIG. 1.

Shown in FIG. 2 are units which may be included in the inventive system which include service vehicles 41; National Bank police authorities 42; GSM/other radio connection 28; called connection 29; technical service banknote transporter 21; optimisation of banknote flows, checking banknote qualities 22; fixed data connection 27; and called connection (GSM) 26.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

The invention claimed is:

1. A banknote-handling system comprising
   a) a plurality of banknote-handling machines for depositing and/or dispensing valuable documents through transactions, each of said banknote handling machines having transaction handling components and separate administrative handling components;
   b) a plurality of banks for accounting of the transactions performed using said banknote-handling machines;
   c) a coordinating central unit configured to communicate with said banknote handling machines for receiving information relating to the banknote content of the machines and to the need for banknotes reported by the general public and businesses or made apparent in some other way, and for sending command signals on the basis of said information and intended for the activation of units within the system;
   d) a transport system including a plurality of service vehicles for physically effecting the requisite transportation of banknotes between the banknote-handling machines and the banks in response to the need at that time;
   e) a central bank for monitoring the activities of said banks in general and the actual handling of banknotes; and
   f) an electronic information system for enabling the individual and mutual activities to take place in said units, said electronic information system being divided into two mutually separate subsystems through which said banknote handling machines communicate with said coordinating central unit including,
   a first subsystem directly connected to said transaction handling components of said banknote-handling machines by a high speed connection and configured to transmit information and signals relating to, and having their basis in transactions, such as banknote-handling, between the banks on one hand and the general public and businesses on the other hand, with respect to their activities within the banknote-handling system; and
   a second subsystem directly connected to said administrative handling components of said banknote-handling machines by a second connection separate from said high speed connection, each of said banknote-handling machines thereby having two different connections each configured for separate transmission of information and signal transfers having their basis in transactions and referred to as transaction data, and administrative and technical signal transfers referred to as logistic and technical data, respectively, of said each banknote-handling machine with said coordinating central unit, said second subsystem being configured to transmit purely administrative and technical signal transmission required in respect of the requisite co-operation between the various units, including coordinating central unit, vehicles and banknote-handling machines, and banks within the banknote-handling system.

2. The banknote-handling system according to claim 1, wherein said second subsystem is, in turn, divided into two separate subsystems, including a technical, third system that includes the technical signal transmission or technical service required in respect of units included in the banknote-handling system;
   an administrative, fourth subsystem which includes administrative signal transmission in respect of the information that is required/desirable with regard to the current flow of banknotes in the banknote-handling system;
   said third subsystem being connected to said service vehicles by a third connection and said fourth subsystem being connected to a central bank by a fourth connection, said third and fourth connections being separate from one another.

3. The banknote-handling system according to claim 2, wherein said third connection is a GSM or other radio connection.

4. The banknote-handling system according to claim 2, wherein said fourth connection is a called connection.

5. The banknote-handling system according to claim 2, wherein said third subsystem is directly connected to said service vehicles by said third connection.

6. The banknote-handling system according to claim 2, wherein said fourth subsystem is directly connected to the central bank by said fourth connection.

7. The banknote-handling system according to claim 1, wherein said high speed connection is a fixed data connection.

8. The banknote-handling system according to claim 1, wherein said second connection is a call connection, GSM or other radio connection.

9. The banknote-handling system according to claim 1, wherein said high speed connection is a fixed data connection and said second connection is a call connection, GSM or other radio connection, said second connection being slower in communication speed than said high speed connection.

10. The banknote-handling system according to claim 1, wherein said transaction handling components include at least a deposit/withdrawal component, a quality sorting component and a one-time cassette component, each of these components being a separate component relative to the others.

11. The banknote-handling system according to claim 1, wherein said administrative handling components include at least a safety box component, a machine statistics component, an error reports component, an erroneous handling component, a suspected forgeries component and a banknote storage component, each of these components being a separate component relative to the others.

12. A banknote-handling system comprising:
   a) a plurality of banknote-handling machines for depositing and/or dispensing valuable documents through transactions, each of said banknote handling machines having transaction handling components and separate administrative handling components;

b) a plurality of banks for accounting of the transactions performed using said banknote-handling machines;

c) a coordinating central unit configured to communicate with said banknote handling machines for receiving information relating to the banknote content of the machines and to the need for banknotes reported by the general public and businesses or made apparent in some other way, and for sending command signals on the basis of said information and intended for the activation of units within the system;

d) a transport system for effecting the requisite transportation of banknotes between the banknote-handling machines and the banks in response to the need at that time;

e) a central bank for monitoring the activities of said banks in general and the actual handling of banknotes; and f) an electronic information system for enabling the individual and mutual activities to take place in said units, said electronic information system being divided into two mutually separate subsystems through which said banknote handling machines communicate with said coordinating central unit including, a first subsystem directly connected to said transaction handling components of said banknote-handling machines by a high speed connection and configured to transmit information and signals relating to, and having their basis in transactions, such as banknote-handling, between the banks on one hand and the general public and businesses on the other hand, with respect to their activities within the banknote-handling system; and a second subsystem directly connected to said administrative handling components of said banknote-handling machines by a second connection separate from said high speed connection, each of said banknote-handling machines thereby having two different connections each configured for separate transmission of information and signal transfers having their basis in transactions and referred to as transaction data and administrative and technical signal transfer referred to as logistic and technical data, respectively, of said each banknote-handling machine with said coordinating central unit, said second subsystem being configured to transmit purely administrative and technical signal transmission required in respect of the requisite co-operation between the various units, including coordinating central unit, vehicles and banknote-handling machines, and banks within the banknote-handling system, said second subsystem being divided into two separate subsystems that include, a technical, third system that includes the technical signal transmission or technical service required in respect of units included in the banknote-handling system; and an administrative, fourth subsystem which includes administrative signal transmission in respect of the information that is required/desirable with regard to the current flow of banknotes in the banknote-handling system;

said third subsystem being directly connected to at least one transport system service vehicle by a third connection and said fourth subsystem being directly connected to a central bank by a fourth connection, said third and fourth connections being separate from one another.

13. The banknote-handling system according to claim 12, wherein said high speed connection is a fixed data connection and said second connection is a call connection, GSM or other radio connection, said second connection being slower in communication speed than said high speed connection.

14. The banknote-handling system according to claim 13, wherein said third connection is a GSM or other radio connection.

15. The banknote-handling system according to claim 14, wherein said fourth connection is a called connection.

16. A banknote-handling system comprising:

a) a plurality of banknote-handling machines for depositing and/or dispensing valuable documents through transactions, each of said banknote handling machines having transaction handling components and separate administrative handling components, said transaction handling components including at least a deposit/withdrawal component, a quality sorting component and a one-time cassette component, and said administrative handling components including at least a safety box component, a machine statistics component, an error reports component, an erroneous handling component, a suspected forgeries component and a banknote storage component, each of said components being a separate component relative to the others;

b) a plurality of banks for accounting of the transactions performed using said banknote-handling machines;

c) a coordinating central unit configured to communicate with said banknote handling machines for receiving information relating to the banknote content of the machines and to the need for banknotes reported by the general public and businesses or made apparent in some other way, and for sending command signals on the basis of said information and intended for the activation of units within the system;

d) a transport system including at least one service vehicle for effecting the requisite transportation of banknotes between the banknote-handling machines and the banks in response to the need at that time;

e) a central bank for monitoring the activities of said banks in general and the actual handling of banknotes; and f) an electronic information system for enabling the individual and mutual activities to take place in said units, said electronic information system being divided into two mutually separate subsystems through which said banknote handling machines communicate with said coordinating central unit including, a first subsystem directly connected to said transaction handling components of said banknote-handling machines by a high speed connection and configured to transmit information and signals relating to, and having their basis in transactions, such as banknote-handling, between the banks on one hand and the general public and businesses on the other hand, with respect to their activities within the banknote-handling system; and a second subsystem directly connected to said administrative handling components of said banknote-handling machines by a second connection separate from said high speed connection, each of said banknote-handling machines thereby having two different connections each configured for separate transmission of information and signal transfers having their basis in transactions and referred to as transaction data and administrative and technical signal transfer referred to as logistic and technical data, respectively, of said each banknote-handling machine with said coordinating central unit, said second subsystem being configured to transmit purely administrative and technical signal transmission required in respect of the requisite co-operation between the various units, including coordinating central unit, vehicles and banknote-handling machines, and banks within the banknote-handling system.

17. The banknote-handling system according to claim 16, wherein said second subsystem is, in turn, divided into two separate subsystems, including a technical, third system that includes the technical signal transmission or technical service required in respect of units included in the banknote-handling system;

an administrative, fourth subsystem which includes administrative signal transmission in respect of the information that is required/desirable with regard to the current flow of banknotes in the banknote-handling system;

said third subsystem being connected to said at least one service vehicle by a third connection and said fourth subsystem being connected to a central bank by a fourth connection, said third and fourth connections being separate from one another.

* * * * *